(12) United States Patent
Cohen et al.

(10) Patent No.: US 10,935,350 B2
(45) Date of Patent: *Mar. 2, 2021

(54) DRONE MITIGATION METHODS AND APPARATUS

(71) Applicants: Nathan Cohen, Belmont, MA (US); Alexander Shelman-Cohen, Belmont, MA (US)

(72) Inventors: Nathan Cohen, Belmont, MA (US); Alexander Shelman-Cohen, Belmont, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/018,371

(22) Filed: Jun. 26, 2018

(65) Prior Publication Data

US 2018/0299231 A1 Oct. 18, 2018

Related U.S. Application Data

(63) Continuation of application No. 15/219,137, filed on Jul. 25, 2016, now Pat. No. 10,006,747.

(60) Provisional application No. 62/282,197, filed on Jul. 25, 2015.

(51) Int. Cl.
| | |
|---|---|
| *G01S 13/66* | (2006.01) |
| *G01S 15/66* | (2006.01) |
| *G01S 17/66* | (2006.01) |
| *F41H 13/00* | (2006.01) |
| *F41H 11/02* | (2006.01) |

(52) U.S. Cl.
CPC ......... *F41H 13/0081* (2013.01); *F41H 11/02* (2013.01); *G01S 13/66* (2013.01); *G01S 15/66* (2013.01); *G01S 17/66* (2013.01)

(58) Field of Classification Search
CPC ...... F41H 13/0081; F41H 11/02; G01S 13/66; G01S 15/66; G01S 17/66
See application file for complete search history.

(56) References Cited

U.S. PATENT DOCUMENTS

| | | | | |
|---|---|---|---|---|
| 5,570,094 | A * | 10/1996 | Armstrong ............ | G01S 13/584 342/107 |
| 5,973,999 | A * | 10/1999 | Naff ....................... | G10K 15/04 181/142 |
| 7,148,974 | B1 * | 12/2006 | Schmitt ................... | G01S 17/66 356/622 |
| 7,551,121 | B1 * | 6/2009 | O'Connell et al. ..... | G01S 17/86 342/54 |
| 9,030,351 | B2 * | 5/2015 | Fox ........................ | G01S 13/867 342/91 |

(Continued)

FOREIGN PATENT DOCUMENTS

| | | |
|---|---|---|
| CN | 103162576 A | 6/2013 |
| CN | 103363841 A | 10/2013 |

*Primary Examiner* — Daniel Pihulic
(74) *Attorney, Agent, or Firm* — Cesari and McKenna, LLP

(57) ABSTRACT

Systems and methods for drone mitigation, or the deterrence of aerial drones from flying in an given area, are described. The systems and methods take advantage of the fact that destabilization of a drone can be accomplished by externally changing the performance of one or more of its propeller driven systems. In doing so, the drone is incapable of maintaining stability in flight, thereby causing the remote controlled pilot to force a retreat, or risk and result in a crash of the drone. Embodiments utilizing sonic energy and liquids are described.

5 Claims, 2 Drawing Sheets

(56) References Cited

U.S. PATENT DOCUMENTS

| | | | | |
|---|---|---|---|---|
| 9,075,143 B2* | 7/2015 | Brundick | ................ | G01S 13/02 |
| 9,111,444 B2* | 8/2015 | Kaganovich | .............. | G06T 7/38 |
| 9,151,836 B2* | 10/2015 | Lee | ........................ | G01S 13/87 |
| 9,239,379 B2* | 1/2016 | Burgio | ................ | G01S 13/536 |
| 9,261,582 B2* | 2/2016 | Zhang | ................ | G01S 5/0205 |
| 9,268,008 B1* | 2/2016 | Abileah | ................ | G01S 7/022 |
| 9,338,551 B2* | 5/2016 | Thyssen | ................ | H04R 3/005 |
| 10,006,747 B2* | 6/2018 | Cohen | ................ | F41H 13/0081 |
| 2009/0242745 A1 | 10/2009 | Bittner et al. | | |
| 2014/0283675 A1 | 9/2014 | Fox et al. | | |
| 2017/0023336 A1* | 1/2017 | Cohen | ................ | F41H 13/0081 |
| 2018/0299231 A1* | 10/2018 | Cohen | ................ | F41H 13/0081 |

* cited by examiner

DRONE MITIGATION METHODS AND APPARATUS

CROSS-REFERENCE TO RELATED APPLICATION

This application is a continuation of U.S. patent application Ser. No. 15/219,137 entitled "Drone Mitigation Methods and Apparatus" filed Jul. 25, 2016, which application is based upon and claims priority to U.S. provisional patent application 62/282,197, entitled "Drone Mitigation Methods and Apparatus," filed 25 Jul. 2015; the entire contents of both of which applications are incorporated herein by reference.

BACKGROUND

In recent years there has been considerable interest in the use of vertical propeller driven unmanned vehicles, often referred to as drones, to produce monitoring of ground-level activities from low or moderate heights. This affords new insight and perspectives that otherwise have remained hidden or obscured through other monitoring techniques.

However there is also created a major problem with intrusion of these drones into areas where they do not belong. For example, drones flying within the vicinity, at low heights, of private property, not only constitute illegal trespass but also may be motivated by illegal surveillance, or industrial espionage. The right to privacy, especially among industrial concerns, has been violated unexpectedly with the advent of drone technology.

Previous efforts to "mitigate" these drone intrusions have relied upon discharge of firearms, usually violating local governmental rules, or FAA regulations.

SUMMARY

Systems and methods for drone mitigation, or the deterrence of aerial drones from flying in an given area, are described. The systems and methods take advantage of the fact that destabilization of a drone can be accomplished by externally changing the performance of one or more of its propeller driven systems. In doing so, the drone is incapable of maintaining stability in flight, thereby causing the remote controlled pilot to force a retreat, or risk and result in a crash of the drone. Embodiments utilizing sonic energy and liquids are described.

These as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

An aspect of this invention takes advantage of the fact that destabilization of a drone can be accomplished by externally changing the performance of one or more of its propeller driven systems. In doing so, the drone is incapable of maintaining stability in flight, thereby causing the remote controlled pilot to force a retreat, or risk and result in a crash of the drone.

One aspect of the invention utilizes a directional sonic device, e.g., a sonic cannon, is pointed at and tracks the drone when it is within the proximity of roughly 50-250 feet of the device. This sonic device produces a compression soundwave, which is either narrow in frequency, or broadband, such that it produces one or more resonant frequencies on the drone propeller or propellers. In doing so it forces a flutter of the lift of one or more of the propellers, instantaneously producing destabilization of flight. Such resonance may also occur at the motor and its support system, which can also accomplish or facilitate destabilization.

The frequency coverage of the sonic cannon may be tailored to produce maximum destabilization of the propellers. And because of this, and its directionality. Other objects, people, and things may not be disturbed in this mitigation process. Furthermore, at greater distances, the sonic compression wave will have sufficiently dissipated as to have no deleterious effects on anything else within the airspace, such as birds, insects, planes, and so on.

Figure 1:
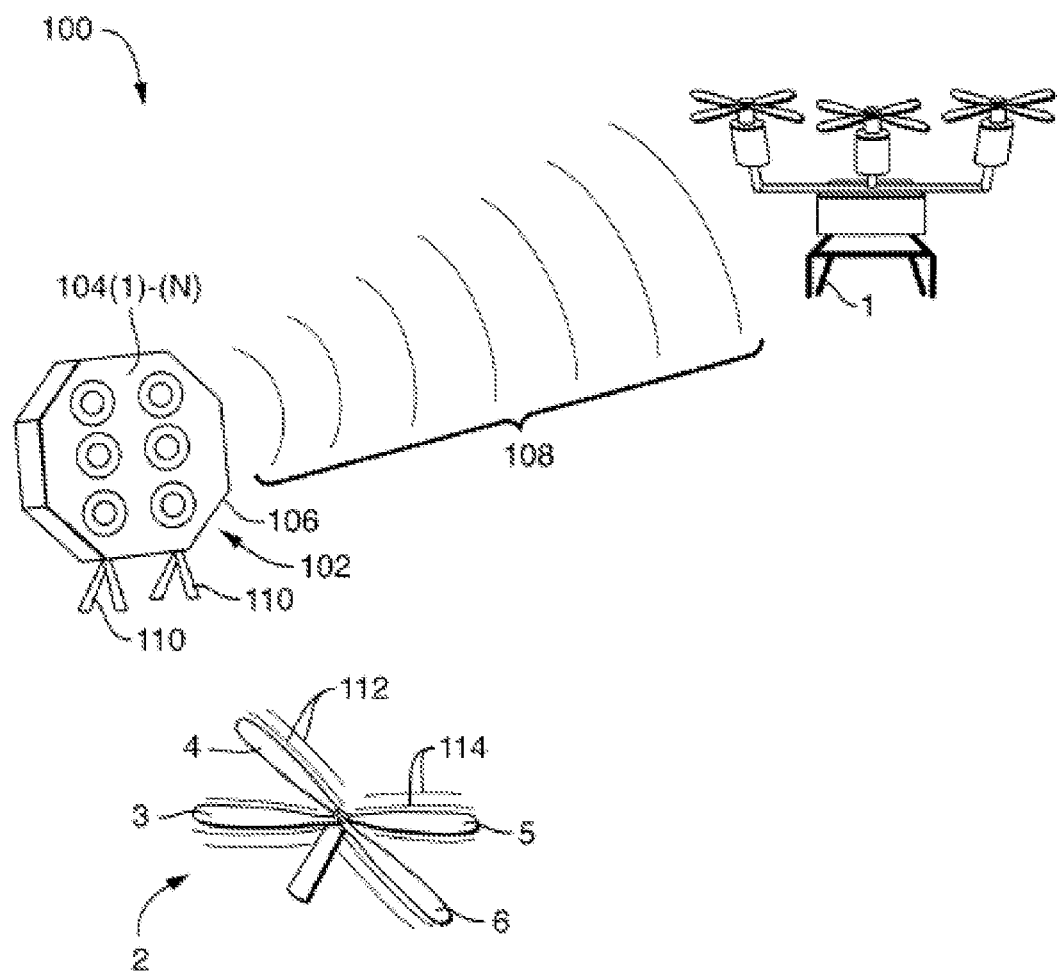
FIG. 1 depicts an embodiment of a drone mitigation system in accordance with the present disclosure.

FIG. 1 depicts an embodiment of a drone mitigation system 100 in accordance with the present disclosure. System 100 can include an array 102 of sound transducers (or, acoustic sources) 104(1)-(N). The array 102 may be held by a suitable frame 106 or other structural support 106. The array 102 is operative to produce sound energy 108 sufficient to destabilize a drone 1 when that sound energy 108 is directed to the drone 1 and the drone 1 is within close enough proximity. Referring to the enlarged view of an individual rotor 2 of the drone 1, as described above, the sound energy 108 produces resonances 112 on and/or between the individual blades (3-6) of rotor 2. The resonances 112 produce wobble or deflection of the blades, as indicated by 114. This wobbling of the blades leads to instability of the drone 1. Control and powering of the sound transducers 104(1)-(N) is provided by power and control unit 110. Of course, the power and control functionalities can be provided by separate units/apparatus, respectively. Power and control unit 110 may also include functionality to direct the orientation of the array 102.

For exemplary embodiments, ultrasonic sound energy may be utilized for the array 102. In other embodiments, a long range acoustic device ("LRAD") may be used for the array 102. For example, a LRAD 2000X device, as made commercially available by the LRAD Corporation, may be used for the array 102; modifications can be made to further provide directivity of the LRAD devices, such as by mounting directivity-enhancing structure (e.g., suitable diameter pipe or horn) over each individual transducer or group of transducers or the entire array. Low-frequency sounds waves (infrasonic energy), e.g., below 100 Hz, may also be utilized. Other suitable transducers (acoustic) sources are described in U.S. Pat. No. 5,973,999, the entire content of which is incorporated herein by reference.

With continued reference to FIG. 1, exemplary embodiments can utilize a tracking and detection functionality, e.g., as provided by tracking and control unit 120. Such a tracking and control unit 120 is operative to detect drones and track them as they fly. Such tracking and detection units can track the drone(s) and direct the acoustic array to follow the drone and/or direct acoustic energy (sound waves or Mach disk) in the direction of the drone(s). As a person of ordinary skill in the art would appreciate, such tracking and detection units can be based on the detection of any suitable type of energy, e.g., radio or radar frequency electromagnetic ("RF") energy, optical energy (e.g., infrared, visible light, and/or ultraviolet), and/or acoustic energy. RF-based tracking and control units can include, but are not limited to, methods and/or apparatus described in the following: (RF-based) U.S. Pat. Nos. 9,268,008, 9,261,582, 9,239,379, 9,151,836, 9,075,143, and 9,030,351; (acoustic-based) U.S. Pat. Nos. 9,338,551, 5,570,094; and/or (optical-based, e.g., LIDAR-based) U.S. Pat. Nos. 9,111,444, 7,551,121, and 7,148,974; other suitable tracking and detection units may be used, as a person of ordinary skill in the art would appreciate. Of course, the detection and tracking functionalities can be provided by separate units/apparatus, respectively.

A second aspect of the invention also relies on destabilization of the propeller the above-mentioned flutter. However rather than using sound waves, the device constitutes a highly directional fluid flow, much like a squirt gun, that contains either non-Newtonian or viscous liquid. Upon impacting the propeller or motor system, the lift of the propeller is severely compromised, and or the counter torque on the rotor system becomes appreciable, thereby either stopping or slowing down the rotation of the propeller. Again this process also is capable of producing destabilization of flight.

Figure 2:
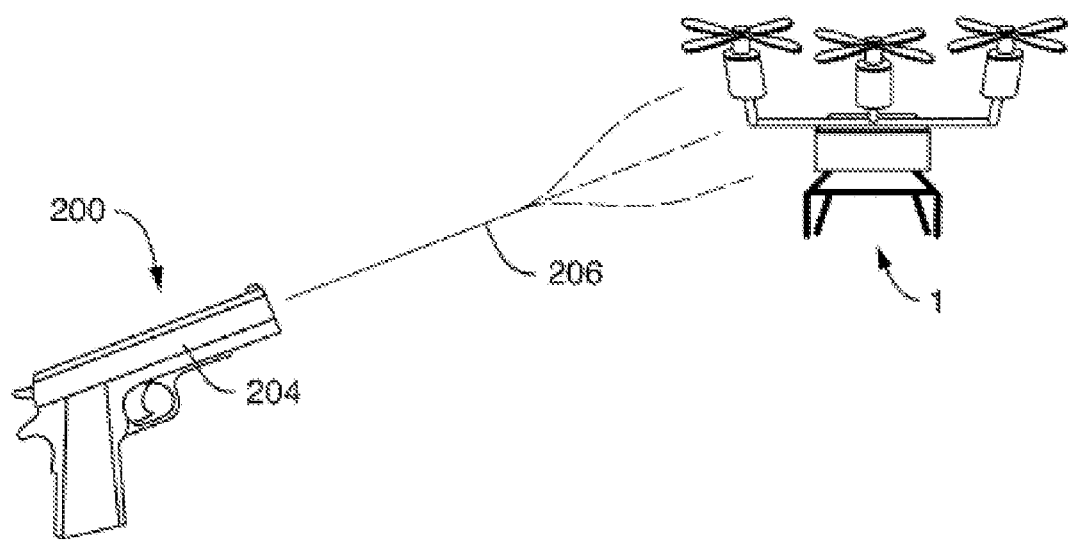
FIG. 2 depicts a further embodiment of a drone mitigation system in accordance with the present disclosure.

FIG. 2 depicts a further embodiment of a drone mitigation system 200 in accordance with the present disclosure. As shown, system 200 includes a nozzle 202 directing the flow of a liquid 206. Liquid 206 is supplied by a fluid source (not shown) and with sufficient pressure (e.g., provided by a suitable pump) to direct liquid from the nozzle a suitable distance, e.g., 50-250 feet, etc. Oil of a suitable viscosity may be used for exemplary embodiments, though any suitable liquid may be used. Though not shown, a suitable power and control unit may be employed for system 200, similar to as described for FIG. 1. Such power and control unit may also include functionality to direct the orientation of the nozzle 202.

Similar to the embodiment of FIG. 1, a suitable tracking and detection unit or units can be used for the embodiment of FIG. 2. As a person of ordinary skill in the art would appreciate, such tracking and detection units can be based on the detection of any suitable type of energy, e.g., radio or radar frequency electromagnetic ("RF") energy, optical energy (e.g., infrared, visible light, and/or ultraviolet), and/or acoustic energy. RF-based tracking and control units can include, but are not limited to, methods and/or apparatus described in the following: (RF-based) U.S. Pat. Nos. 9,268,008, 9,261,582, 9,239,379, 9,151,836, 9,075,143, and 9,030,351; (acoustic-based) U.S. Pat. Nos. 9,338,551, 5,570,094; and/or (optical-based, e.g., LIDAR-based) U.S. Pat. Nos. 9,111,444, 7,551,121, and 7,148,974; other suitable tracking and detection units may be used, as a person of ordinary skill in the art would appreciate. Of course, the detection and tracking functionalities can be provided by separate units/apparatus, respectively.

Unless otherwise indicated, the control operation of arrays/transducers, and liquids that have been discussed herein can be implemented with a specially-configured computer system specifically configured to perform the functions that have been described herein for the component. Each computer system includes one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each computer system may be a desktop computer or a portable computer, such as a laptop computer, a notebook computer, a tablet computer, a PDA, a smartphone, or part of a larger system, such a vehicle, appliance, and/or telephone system. Each computer system may include one or more computers at the same or different locations. When at different locations, the computers may be configured to communicate with one another through a wired and/or wireless network communication system.

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, or the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

For example, other transducers and frequencies of operation may than those described above may be used within the scope of the present invention. Likewise, other liquids that those described above may be used within the scope of the present invention.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A sound-based drone mitigation system comprising:
   an array of sonic transducers operative to produce sonic energy sufficient to cause resonances on the blades of a rotor and;
   wherein the resonances are produced by broadband and or narrowband sonic energy transmissions and wherein the resonances are at sonic frequencies.

2. A sound based drone mitigation system comprising:
   an array of sonic transducers operative to produce sonic energy sufficient to cause resonances on the blades of a rotor and;
   wherein the resonances are produced by broadband and or narrowband sonic energy transmissions and wherein the resonances are at ultrasonic frequencies.

3. A sound-based drone mitigation system comprising:
   an array of sonic transducers operative to produce sonic energy sufficient to cause resonances on the blades of a rotor; and
   wherein the resonances are produced by broadband and or narrowband sonic energy transmissions and wherein the resonances are at infrasonic frequencies.

4. The system of claim 1 wherein there the sonic energy transmissions comprise ultrasonic energy.

5. The system of claim 1, wherein the sonic energy transmissions comprise infrasonic energy.

* * * * *